(12) United States Patent
Ohshima et al.

(10) Patent No.: US 12,236,306 B2
(45) Date of Patent: Feb. 25, 2025

(54) CONTACTLESS INFORMATION CARRIER

(71) Applicant: SK-ELECTRONICS CO., LTD., Kyoto (JP)

(72) Inventors: Kiyoshi Ohshima, Kyoto (JP); Hideki Kobayashi, Kyoto (JP)

(73) Assignee: SK-ELECTRONICS CO., LTD., Kyoto (JP)

( * ) Notice: Subject to any disclaimer, the term of this patent is extended or adjusted under 35 U.S.C. 154(b) by 362 days.

(21) Appl. No.: 17/594,302

(22) PCT Filed: Apr. 7, 2020

(86) PCT No.: PCT/JP2020/015714
§ 371 (c)(1),
(2) Date: Oct. 8, 2021

(87) PCT Pub. No.: WO2020/209261
PCT Pub. Date: Oct. 15, 2020

(65) Prior Publication Data
US 2022/0172019 A1    Jun. 2, 2022

(30) Foreign Application Priority Data

Apr. 10, 2019   (JP) ................................ 2019-075071

(51) Int. Cl.
*G08B 23/00*       (2006.01)
*G06K 19/07*       (2006.01)
(Continued)

(52) U.S. Cl.
CPC ... *G06K 19/07779* (2013.01); *G06K 19/0723* (2013.01); *G06K 19/07722* (2013.01);
(Continued)

(58) Field of Classification Search
CPC ......... G06K 19/07779; G06K 19/0723; G06K 19/07722; G06K 19/07775; H01Q 1/2208; H01Q 7/00
See application file for complete search history.

(56) References Cited

U.S. PATENT DOCUMENTS 6,404,644 B1    6/2002  Ikefuji et al.
6,424,315 B1 *  7/2002  Glenn ..................... H01Q 9/27
                                            343/895
(Continued)

FOREIGN PATENT DOCUMENTS

CN    101189625 A    5/2008
JP    H04167719 A    6/1992
(Continued)

OTHER PUBLICATIONS

United States Patent and Trademark Office, Certificate of Correction Issued in U.S. Appl. No. 11/561,699, U.S. Pat. No. 7,667,329B2, filed Feb. 23, 2010, 1 page.
(Continued)

*Primary Examiner* — Quang Pham
(74) *Attorney, Agent, or Firm* — McCoy Russell LLP (57) ABSTRACT

A contactless information medium is provided with a spiral wiring on an IC chip. The IC chip has first and second electrodes, and the spiral wiring has first and second end portions electrically connected to the first and second electrodes, respectively. A first relay wiring is connected to the first electrode via a first connecting hole. The first end portion is connected to the first relay wiring via a third connecting hole formed on an inner peripheral side of the spiral wiring. The first relay wiring includes a rectangular region diagonally including the first connecting hole and the third connecting hole.

4 Claims, 9 Drawing Sheets

(51) Int. Cl.
G06K 19/077 (2006.01)
H01Q 1/22 (2006.01)
H01Q 7/00 (2006.01)
(52) U.S. Cl.
CPC ..... G06K 19/07775 (2013.01); *H01Q 1/2208* (2013.01); *H01Q 7/00* (2013.01)

(56) References Cited

U.S. PATENT DOCUMENTS

| | | | | |
|---|---|---|---|---|
| 6,867,983 | B2* | 3/2005 | Liu | H05K 3/32 257/692 |
| 7,605,706 | B2* | 10/2009 | Khatri | H01Q 9/0407 340/568.1 |
| 7,667,329 | B2 | 2/2010 | Rogge | |
| 7,808,030 | B2* | 10/2010 | Mizuno | H05K 1/162 257/303 |
| 8,136,735 | B2* | 3/2012 | Arai | G06K 19/07718 235/487 |
| 8,676,117 | B2* | 3/2014 | Dokai | H01L 23/642 455/333 |
| 9,436,902 | B1* | 9/2016 | Koepp | G06K 19/07752 |
| 9,684,864 | B1* | 6/2017 | Liu | G06K 19/07779 |
| 10,248,902 | B1* | 4/2019 | Finn | G06K 19/07794 |
| 10,886,047 | B2* | 1/2021 | Kurz | H04B 5/79 |
| 11,004,599 | B2* | 5/2021 | Kurz | H01F 27/2852 |
| 2001/0027009 | A1* | 10/2001 | Matsubara | H01L 21/76807 438/618 |
| 2001/0044013 | A1* | 11/2001 | McDonough | G08B 13/244 428/209 |
| 2002/0160786 | A1* | 10/2002 | Rietzler | H01Q 9/27 340/572.1 |
| 2003/0085454 | A1* | 5/2003 | Reutner | G06K 19/0775 257/679 |
| 2005/0046573 | A1* | 3/2005 | Velasco | H05K 3/067 340/572.8 |
| 2006/0143898 | A1* | 7/2006 | Kwak | G06K 19/07783 343/866 |
| 2007/0187820 | A1* | 8/2007 | Takano | H01Q 1/36 257/E27.113 |
| 2009/0146790 | A1* | 6/2009 | Speich | G06K 19/07783 340/10.1 |
| 2009/0160719 | A1* | 6/2009 | Kato | G06K 19/07749 343/788 |
| 2009/0289797 | A1* | 11/2009 | Sakama | G06K 19/041 340/572.8 |
| 2010/0001079 | A1* | 1/2010 | Martin | G08B 13/2414 235/492 |
| 2011/0024510 | A1* | 2/2011 | Kato | G06K 19/07784 235/492 |
| 2011/0063184 | A1* | 3/2011 | Furumura | G06K 19/07783 343/856 |
| 2011/0073661 | A1* | 3/2011 | Forster | G06K 19/07783 235/492 |
| 2011/0090058 | A1* | 4/2011 | Ikemoto | H01Q 9/285 340/10.1 |
| 2011/0128195 | A1* | 6/2011 | Ryou | H01Q 7/00 343/702 |
| 2011/0266351 | A1* | 11/2011 | Wagner | G06K 19/07749 438/108 |
| 2012/0091821 | A1* | 4/2012 | Kato | H01P 11/001 307/104 |
| 2012/0326931 | A1* | 12/2012 | Murayama | G06K 19/07749 343/866 |
| 2013/0002502 | A1* | 1/2013 | Wang | H01Q 1/2283 343/893 |
| 2013/0154885 | A1* | 6/2013 | Schindler | G06K 19/07779 156/247 |
| 2013/0186961 | A1* | 7/2013 | Kimura | G06K 19/07786 235/492 |
| 2014/0124582 | A1* | 5/2014 | Kroener | G06K 19/07745 29/601 |
| 2014/0198011 | A1* | 7/2014 | Tsubaki | H01Q 7/00 343/867 |
| 2014/0203976 | A1* | 7/2014 | Yosui | H01Q 7/08 343/788 |
| 2014/0203991 | A1* | 7/2014 | Yosui | G06K 19/07749 343/866 |
| 2014/0217183 | A1* | 8/2014 | Yosui | G06K 19/07783 343/702 |
| 2014/0292611 | A1* | 10/2014 | Kubo | G06K 7/10336 343/867 |
| 2014/0319230 | A1* | 10/2014 | Murayama | H01F 38/14 235/492 |
| 2015/0035718 | A1* | 2/2015 | Gouchi | H01Q 1/38 343/788 |
| 2015/0077296 | A1* | 3/2015 | An | H02J 50/12 320/108 |
| 2015/0161502 | A1* | 6/2015 | Liu | G06K 19/07743 235/488 |
| 2015/0171519 | A1* | 6/2015 | Han | H02J 50/70 343/720 |
| 2015/0346039 | A1* | 12/2015 | Ito | H01Q 7/00 374/117 |
| 2015/0356395 | A1* | 12/2015 | Haring | G06K 19/07743 235/492 |
| 2016/0275391 | A1* | 9/2016 | Sattlegger | G06K 19/07783 |
| 2017/0017868 | A1* | 1/2017 | Komaki | G06K 19/077 |
| 2017/0040107 | A1* | 2/2017 | Peralta | H02J 5/00 |
| 2017/0040665 | A1* | 2/2017 | Takashima | H01Q 1/2291 |
| 2017/0054213 | A1* | 2/2017 | Singh | H04B 5/26 |
| 2017/0194711 | A1* | 7/2017 | Nakano | H01Q 1/2216 |
| 2018/0194158 | A1* | 7/2018 | Ayala | G06K 19/07773 |
| 2018/0216906 | A1* | 8/2018 | Gonzalez | H01Q 1/2225 |
| 2018/0240005 | A1* | 8/2018 | Klemm | G06K 19/07767 |
| 2018/0277943 | A1* | 9/2018 | Kristl | H01Q 1/2225 |
| 2018/0277954 | A1* | 9/2018 | Lee | H01Q 9/27 |
| 2018/0287258 | A1* | 10/2018 | Kim | G06K 7/10336 |
| 2019/0000427 | A1* | 1/2019 | Findlay | A61B 5/4266 |
| 2019/0012589 | A1* | 1/2019 | Ma | G06K 19/07783 |
| 2019/0042907 | A1* | 2/2019 | Buyukkalender | G06K 19/07794 |
| 2019/0080215 | A1* | 3/2019 | Kobayashi | G06K 19/07775 |
| 2019/0267698 | A1* | 8/2019 | Mukherjee | H01Q 7/00 |
| 2019/0294217 | A1* | 9/2019 | Yoon | H01Q 1/14 |

FOREIGN PATENT DOCUMENTS

| | | | |
|---|---|---|---|
| JP | 2001351082 A | * | 12/2001 |
| JP | 2002092568 A | | 3/2002 |
| JP | 2004280627 A | | 10/2004 |
| JP | 6251770 B2 | | 12/2017 |
| JP | 2018085730 A | | 5/2018 |
| WO | 2015182638 A1 | | 12/2015 |

OTHER PUBLICATIONS

European Patent Office, Extended European Search Report Issued in Application No. 20786719.3, Nov. 16, 2022, Germany, 8 pages.
State Intellectual Property Office of the People's Republic of China, Office Action and Search Report Issued in Application No. 202080027776.6, Apr. 6, 2022, 12 pages. (Submitted with Partial Translation).
Japanese Patent Office, Office Action Issued in Application No. 2019-075071, May 28, 2022, 6 pages.
ISA Japan Patent Office, International Search Report Issued in Application No. PCT/JP2020/015714, Jul. 7, 2020, WIPO, 4 pages.

* cited by examiner

CONTACTLESS INFORMATION CARRIER

CROSS REFERENCE TO RELATED APPLICATIONS

The present application is a U.S. National Phase of International Application No. PCT/JP2020/015714 entitled "CONTACTLESS INFORMATION CARRIER," and filed on Apr. 7, 2020. International Application No. PCT/JP2020/015714 claims priority to Japanese Patent Application No. 2019-075071 filed on Apr. 10, 2019. The entire contents of each of the above-listed applications are hereby incorporated by reference for all purposes.

TECHNICAL FIELD

The present disclosure relates to a contactless information carrier provided with an on-chip type antenna for transmitting and receiving a signal to and from a reader/writer in a contactless manner.

BACKGROUND

There has been known a contactless information carrier (for example, an RFID tag) provided with an antenna coil for performing communication with a reader/writer in a contactless manner by electromagnetic waves and an IC chip for recording information. In recent years, in response to a demand for miniaturization, contactless information carriers having an "on-chip type antenna" in which an antenna is integrated with an IC chip have been developed (Patent Literatures 1 to 4).

CITATION LIST

Patent Literatures

Patent Literature 1: Japanese Patent Laid-Open No. 04-167719
Patent Literature 2: Japanese Patent No. 6251770
Patent Literature 3: Japanese Patent Laid-Open No. 2002-92568
Patent Literature 4: Japanese Patent Laid-Open No. 2001-351082

SUMMARY

Technical Problem

Although various methods for connecting a wiring of a circuit pattern of the IC chip and a wiring of the antenna coil can be considered, from the viewpoint of sufficiently satisfying the demand for miniaturization, it is considered effective to adopt a three-dimensional wiring structure provided with a wiring layer as a lower layer of the wiring of the antenna coil as shown in Patent Literatures 3 and 4, in other words, a multi-layer wiring structure, for example, so that a connection is made as a pattern in which both terminals of the antenna coil and electrodes of the IC chip are formed in a chip state.

However, when an interlayer insulating film is formed on a circuit wiring formed on a flat surface and the wiring pattern of the antenna coil is formed across the circuit wiring (in other words, in such a manner as to form a three-dimensional intersection), at an edge portion of the wiring of the lower layer (the circuit wiring), a distance to the upper layer wiring (antenna) tends to be close, and for instance, when a step covering property (coverage) of the interlayer insulating film is poor, a short circuit may occur. Therefore, from the viewpoint of such electrical characteristics, it is required to sufficiently secure the step covering property.

Solution to Problem

A contactless information medium according to the present disclosure is provided with
an IC chip (1) having a first electrode (2a) and a second electrode (2b), and
a spiral wiring (9) having a first end portion (10a) and a second end portion (10b) electrically connected to the first electrode (2a) and the second electrode (2b), respectively, in which
the IC chip (1) is provided with
a first insulating film (3) on the first electrode (2a) and the second electrode (2b),
a first relay wiring (5a) on the first insulating film (3), and
a second insulating film (6) on the first relay wiring (5a),
the spiral wiring (9) is formed on the second insulating film (6),
the first end portion (10a) and the second end portion (10b) are positioned on an inner peripheral side and an outer peripheral side of the spiral wiring (9), respectively,
the first electrode (2a) and the second electrode (2b) are positioned on the outer peripheral side of the spiral wiring (9), and
the first relay wiring (5a)
is connected to the first electrode (2a) via a first connecting hole (4a) formed in the first insulating film (3) and is connected to the first end portion (10a) via a third connecting hole (7a) formed in the second insulating film (6), and
includes a rectangular region diagonally including the first connecting hole (4a) and the third connecting hole (7a).

Advantageous Effect

According to the above structure, it is possible to provide a contactless information carrier provided with an IC chip having an on-chip type antenna capable of realizing good electrical characteristics.

BRIEF DESCRIPTION OF THE FIGURES

FIGS. 3a, 3b, and 3c are sectional views

DETAILED DESCRIPTION

Hereinafter, embodiments of the present disclosure will be described with reference to the drawings. However, none of the following embodiments is intended to give a limiting interpretation in finding the gist of the present disclosure. In addition, the same or the same type of member may be denoted by the same reference sign and the description thereof may be omitted.

First Embodiment

Hereinafter, a method of manufacturing an antenna of a first embodiment formed by a wafer process will be described.

Figure 1A:
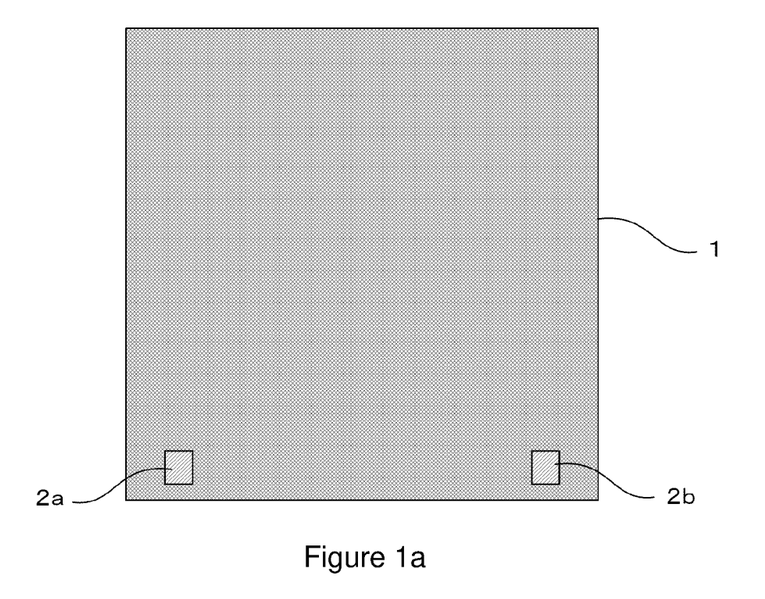
FIG. 1a is a top view and FIGS. 1b, 1c, and 1d are sectional views illustrating a main manufacturing process of an on-chip type antenna according to a first embodiment of the present disclosure.
Figure 1B:
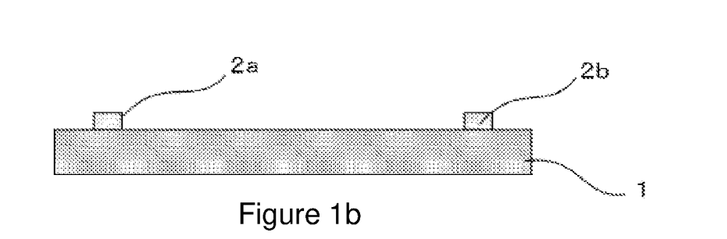

FIGS. 1a and 1b illustrate a top view and a sectional view of an IC chip 1 in the wafer process, and electrodes 2 (a first electrode 2a and a second electrode 2b) electrically connected to a circuit are formed on corner portions of an outer peripheral portion of the IC chip 1 on an insulating film (for example, a silicon nitride film, a resin film, or the like that is a passivation film) formed on an upper surface of the IC chip 1 of a contactless information carrier (an RFID tag).

The IC chip 1 is in a shape of, for example, a rectangle (including a square) with sides each having a length of 0.5 mm to 1 mm, but the shape thereof is not limited thereto. In addition, the arrangement of the first electrode 2a and the second electrode 2b is not limited to the positional relationship illustrated in the drawings, and the first electrode 2a and the second electrode 2b may be arranged on outer peripheral portions of different sides of the IC chip 1, for example.

Note that although one IC chip 1 is illustrated on a wafer in the figures, a plurality of IC chips 1 are certainly formed in alignment on one wafer in the wafer process.

The electrodes 2 are formed by a known wafer process technique, in which a film of metal such as copper, aluminum, or the like is formed by a vapor deposition method, a sputtering method, a plating method, or the like, so as to be patterned by a photolithography method and an etching method. The electrodes 2 are connected to an electronic circuit of the IC chip 1 via unillustrated connecting holes.

Note that although the IC chip 1 is provided with electronic circuits (a memory, a memory control unit, a transmission unit, a power supply unit, and the like) necessary for a contactless information carrier, such as the electronic circuits described in Patent Literature 1, for example, the electronic circuits are not limited thereto. In the following drawings, the electronic circuits are omitted for the sake of simplicity.

In addition, the electrodes 2 may be bumps.

Figure 1C:
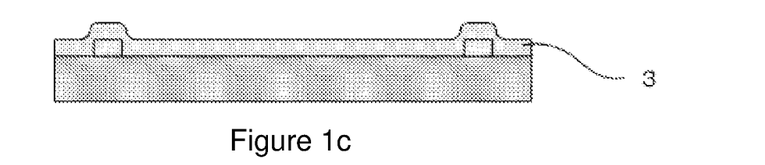

As illustrated in FIG. 1c, a rotary coating film is formed on the IC chip 1. Specifically, for example, a first insulating film 3 (for example, a resin film of polyimide or the like, or a silicon oxide film) is formed by a spin coating method. The film thickness of the rotary coating film obtained at the end is, for example, 2 μm to 10 μm.

Figure 1D:
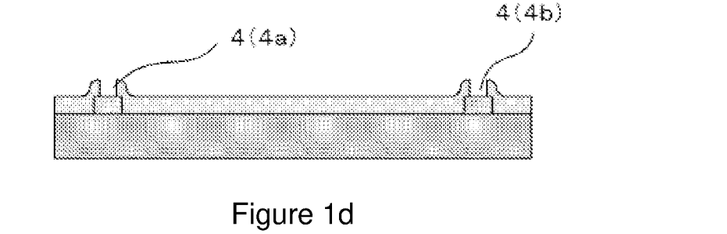

After that, as illustrated in FIG. 1d, a pattern of a photoresist is formed by using a lithography method, and then the first insulating film 3 is selectively etched by an etching method, leaving the necessary pattern. After that, openings (connecting holes) 4 are formed on the electrodes 2 by eliminating the photoresist. Specifically, a first opening 4a and a second opening 4b are formed on the first electrode 2a and the second electrode 2b, respectively. Alternatively, as another method, a photosensitive resin (a positive type or a negative type) of photosensitive polyimide or the like may be formed, exposed by a photolithography method, and selectively etched (developed) with an etching solution to form the openings (connecting holes or via holes) 4.

Figure 2A:
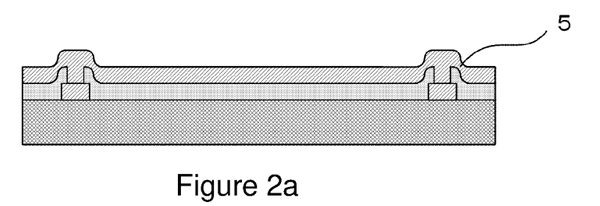
FIGS. 2a and 2b are sectional views and FIG. 2c is a top view illustrating the main manufacturing process of the on-chip type antenna according to the first embodiment of the present disclosure.

After that, as illustrated in FIG. 2a, a first conductive film 5 of, for example, copper, aluminum, or the like, having a film thickness of 2 μm to 5 μm, for example, is formed by a vapor deposition method, a sputtering method, a plating method, or the like. In the step illustrated in FIG. 2a, the first conductive film 5 is also formed in the openings (connecting holes) 4.

Figure 2B:
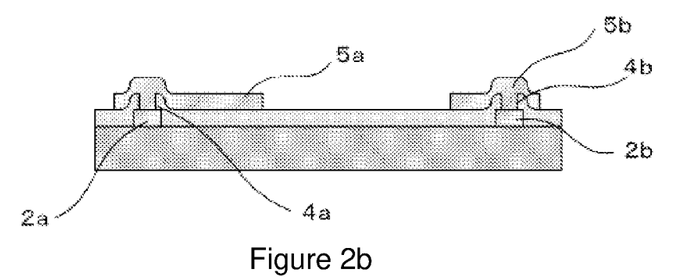

After that, as illustrated in FIG. 2b, after forming a photoresist by a photolithography method, for example, the first conductive film 5 is etched by wet etching or dry etching using the photoresist as a mask, and then the photoresist is eliminated so that the first conductive film 5 is patterned to form a first lower layer wiring 5a and a second lower layer wiring 5b.

Figure 2C:
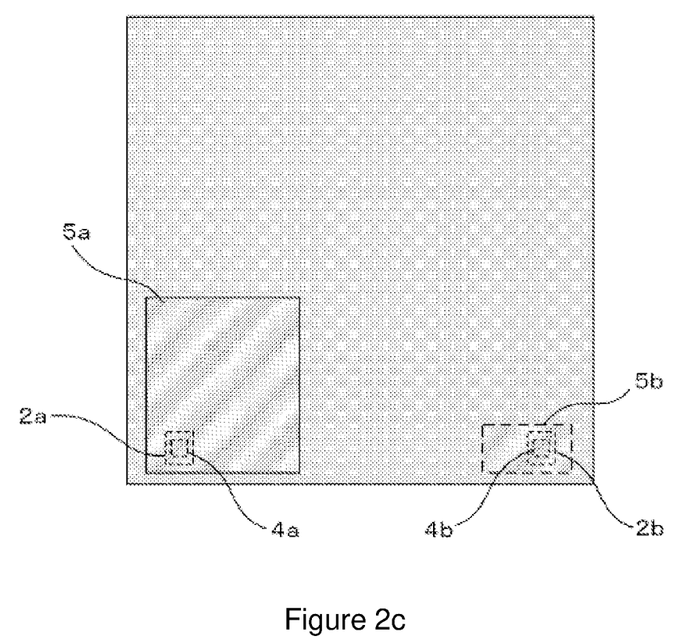

FIG. 2c is a top view of the IC chip 1 on which the first lower layer wiring 5a and the second lower layer wiring 5b are formed. As illustrated in FIGS. 2b and 2c, the first lower layer wiring 5a and the second lower layer wiring 5b are electrically connected to the first electrode 2a and the second electrode 2b via the first opening 4a and the second opening 4b, respectively.

Figure 3A:
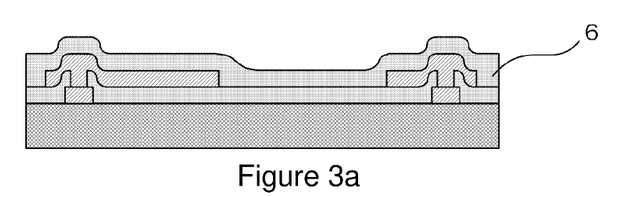

Next, as illustrated in FIG. 3a, a second insulating film 6 (for example, a resin film of polyimide or the like, or a silicon oxide film) having a film thickness of 2 μm to 10 μm, for example, is formed by a rotary coating method or the like.

Figure 3B:
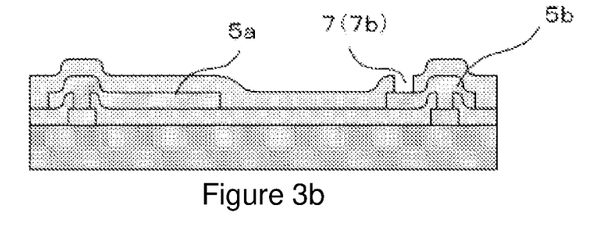
Figure 3C:
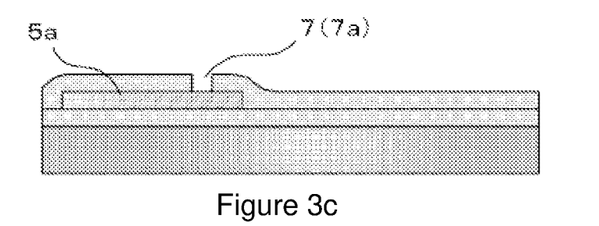

After that, as illustrated in FIGS. 3b and 3c, by a combination of a photolithography method and an etching method, openings (connecting holes) 7 are formed, and more specifically, a third opening 7a and a fourth opening 7b are formed on the first lower layer wiring 5a and the second lower layer wiring 5b, respectively.

Note that a photosensitive resin may be used as the second insulating film 6 to form the openings (connecting holes) 7 by a photolithography method.

Figure 3D:
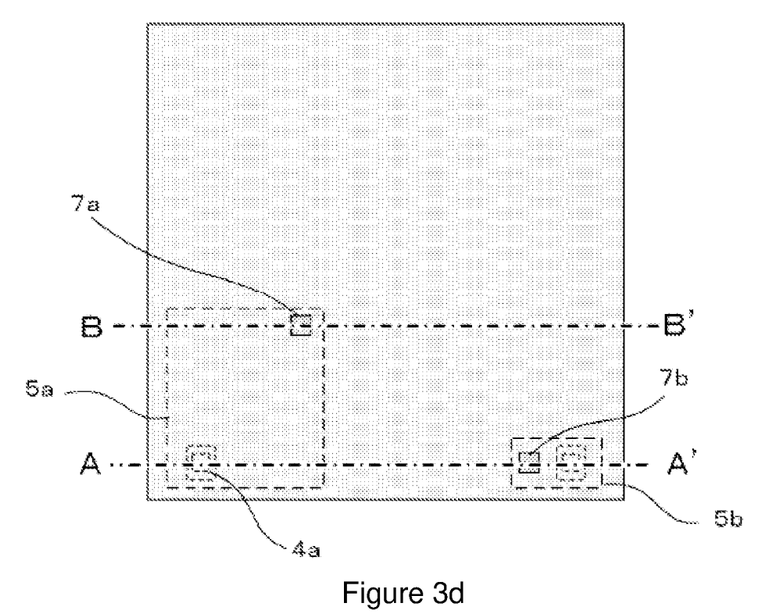
FIG. 3d is a top view illustrating the main manufacturing process of the on-chip type antenna according to the first embodiment of the present disclosure.

FIG. 3d is a top view of the IC chip 1 in the present step, and FIGS. 3b and 3c are sectional views taken along the lines A-A' and B-B' of FIG. 3d, respectively.

Figure 4A:
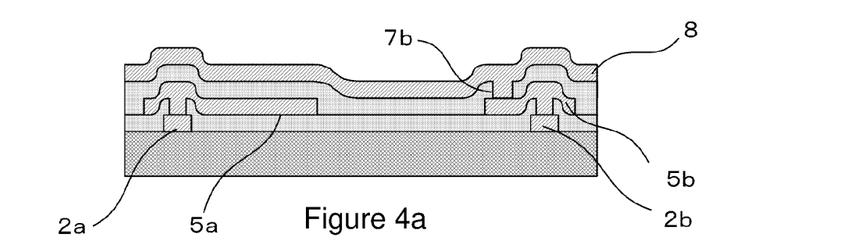
FIGS. 4a and 4b are sectional views and FIG. 4c is a top view illustrating the main manufacturing process of the on-chip type antenna according to the first embodiment of the present disclosure.
Figure 4B:
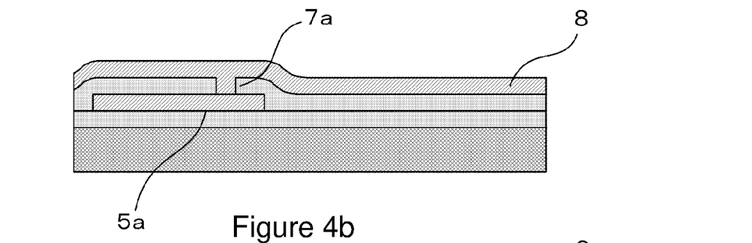

Next, as illustrated in FIGS. 4a and 4b, a second conductive film 8 of copper, aluminum, or the like, for example, having a film thickness of 2 μm to 10 μm, for example, is formed by a vapor deposition method, a sputtering method, a plating method, or the like.

Figure 4C:
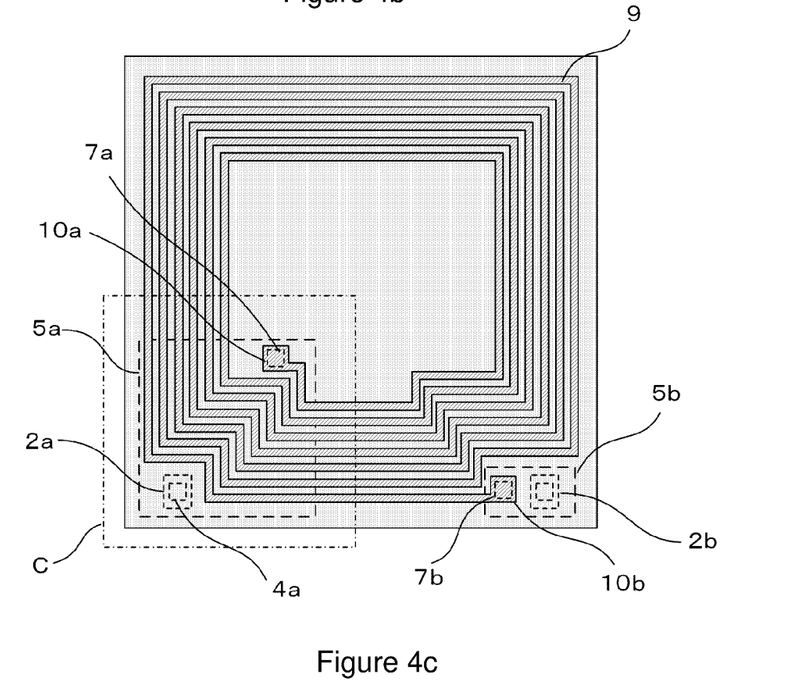

After that, as illustrated in FIG. 4c, the second conductive film 8 is patterned by a combination of a photolithography method and an etching method to form an antenna wiring (spiral wiring) 9 that is an upper layer wiring. In addition, the antenna wiring 9 is arranged such that the first electrode 2a and the second electrode 2b are positioned on an outer peripheral side of the antenna wiring 9.

FIG. 4c is a top view in the present step.

The antenna wiring 9 is a spiral wiring having a winding (spiral) shape with a line width of, for example, 7 μm to 15 μm, has a line spacing (space width) of, for example, 7 μm to 15 μm, and is wound a plurality of times, for example, 2 to 10 times. The IC chip 1 has a region in which the antenna wiring 9 is not formed in the central portion thereof.

As illustrated in FIG. 4c, the antenna wiring 9 has a first end portion 10a and a second end portion 10b, which cover the third opening 7a and the fourth opening 7b and are positioned on an inner peripheral side and the outer peripheral side of the antenna wiring 9 in a spiral shape (spiral wiring), respectively.

The first end portion 10a and the second end portion 10b are electrically connected to the first lower layer wiring 5a and the second lower layer wiring 5b in (via) the third opening 7a and the fourth opening 7b, respectively. For this reason, the first end portion 10a is electrically connected to the first electrode 2a via the third opening 7a (inner peripheral side connecting hole) positioned on the inner peripheral side, the first lower layer wiring 5a, and the first opening 4a (outer peripheral side connecting hole) positioned on the outer peripheral side. Therefore, the first lower layer wiring 5a is a relay wiring (a first relay wiring) for electrically relaying the first end portion 10a positioned on the inner peripheral side to the first electrode 2a positioned on the outer peripheral side.

In addition, the second end portion 10b is electrically connected to the second electrode 2b via the second lower layer wiring 5b, and the second lower layer wiring 5b is a relay wiring (a second relay wiring) for electrically relaying the second end portion 10b to the second electrode 2b.

Note that the second end portion 10b may be connected to the second electrode 2b without passing via (using) the second lower layer wiring 5b. For example, the second opening 4b and the fourth opening 7b may be aligned with each other on the second electrode 2a to directly connect the second end portion 10b to the second electrode 2b via the second opening 4b and the fourth opening 7b. Alternatively, a conductive plug may be embedded in both the openings (connecting holes) so that both the openings are overlapped with each other in the vertical direction.

Figure 5A:
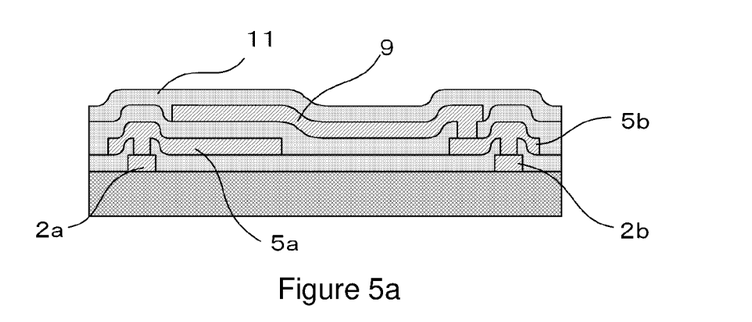
FIGS. 5a and 5b are sectional views and FIG. 5c is a top view illustrating the main manufacturing process of the on-chip type antenna according to the first embodiment of the present disclosure.
Figure 5B:
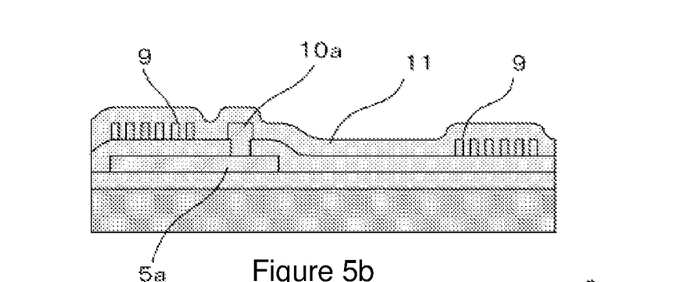
Figure 5C:
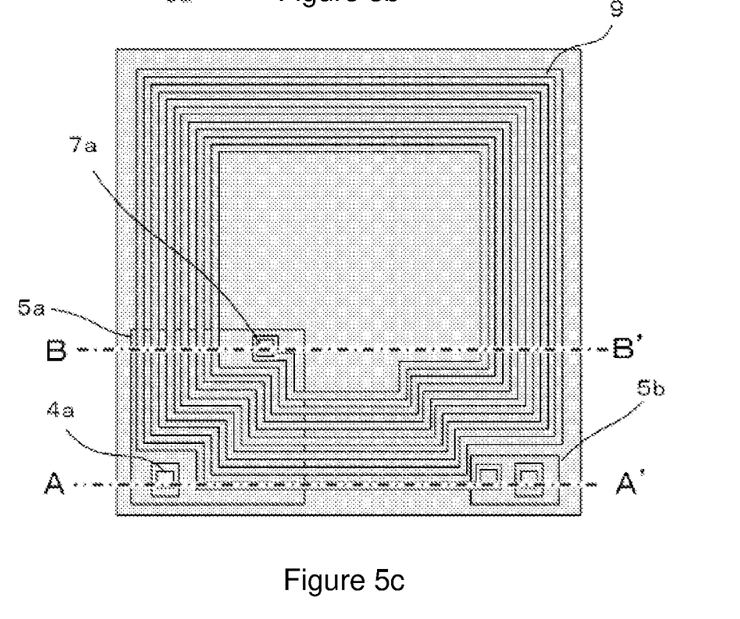

After that, as illustrated in FIGS. 5a to 5c, a third insulating film 11, for example, a resin film or the like of polyimide or the like is formed, as a protective film for protecting the antenna wiring 9, by a coating method or the like.

Note that FIG. 5c illustrates a top view of the IC chip 1 in the present step, and FIG. 5a and FIG. 5b illustrate cross sections taken along the lines A-A' and B-B' of FIG. 5c, respectively.

Figures 6A, 6B:
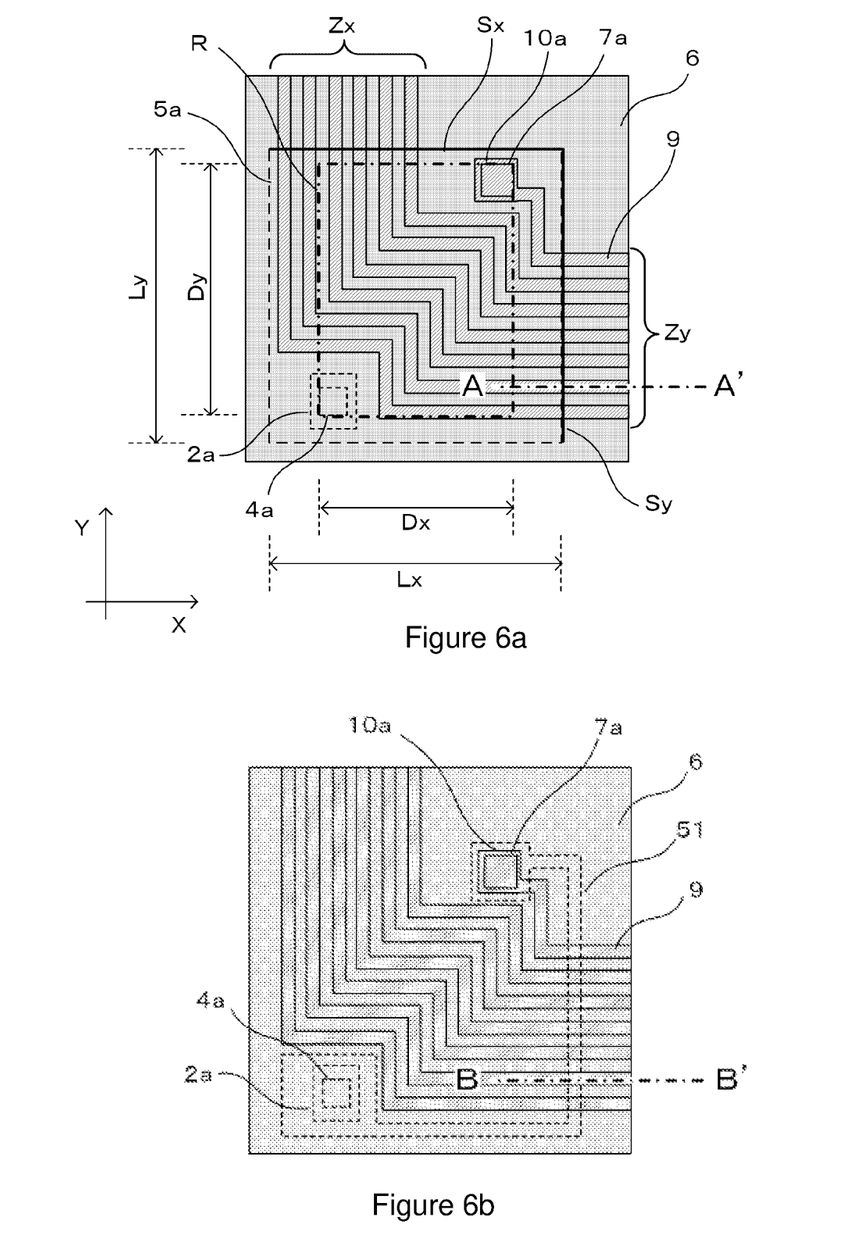
FIG. 6a is an enlarged top view of the on-chip type antenna according to the first embodiment of the present disclosure.
FIG. 6b is an enlarged top view of an on-chip type antenna using a conventional wiring structure.

FIG. 6a is an enlarged view of a region C illustrated by the alternate long and short dash line in FIG. 4c.

As illustrated in FIG. 6a, the first lower layer wiring 5a is formed in such a manner as to include a region of a virtual rectangle R having, at the apexes of the diagonal line, the first opening 4a formed at the upper part of the first electrode 2a and the third opening 7a formed at the lower part of the first end portion 10a of the antenna wiring 9. The first lower layer wiring 5a has, for example, a rectangular shape. Note that, strictly speaking, the first opening 4a and the third opening 7a are not points because they each have a finite size, but the rectangle can be defined as the smallest rectangle including the first opening 4a and the third opening 7a arranged diagonally.

FIG. 6b illustrates a top view of the IC chip when a line-shaped wiring 51 is used instead of the first lower layer wiring 5a as the lower layer wiring. As disclosed in Patent Literature 3, the width of the line-shaped wiring 51 is approximately the same as the line width of the antenna wiring 9.

As illustrated in FIG. 6a, the first opening 4a is positioned on the outer peripheral side of the antenna wiring 9, and the third opening 7a is positioned on the inner peripheral side of the antenna wiring 9. The virtual rectangle R including the first opening 4a and the third opening 7a is a rectangle in which a length of one side is equal to a maximum distance Dx in the X-axis direction including the first opening 4a and the third opening 7a, and a length of the other side is equal to a maximum distance Dy in the Y-axis direction including the first opening 4a and the third opening 7a. The first lower layer wiring 5a has a shape including this rectangle R. For example, the first lower layer wiring 5a can be a rectangle having a side Sx with a length Lx in the X-axis direction and a side Sy with a length Ly in the Y-axis direction in FIG. 6a, wherein Lx≥Dx and Ly≥Dy. In the first lower layer wiring 5a, a plurality of antenna wirings 9 intersect in different directions (the Y-axis direction and the X-axis direction), respectively, on the two sides intersecting each other having the lengths Lx and Ly.

In addition, when the total wiring widths in the X-axis direction and the Y-axis direction in which lines of the plurality of antenna wirings 9 are lined up are Zx and Zy (see FIG. 6a), Lx≥Zx and Ly≥Zy. Note that Zx and Zy are, for example, 30 μm to 90 μm, but are not limited thereto.

The first lower layer wiring 5a functions as a wiring for electrically connecting the first electrode 2a and the first end portion 10a. By forming the first lower layer wiring 5a in the above-described shape, unlike the case of the line-shaped wiring 51 illustrated in FIG. 6b, an electric current flows two-dimensionally, which may reduce electrical resistance between the first electrode 2a and the first end portion 10a.

Figure 7A:
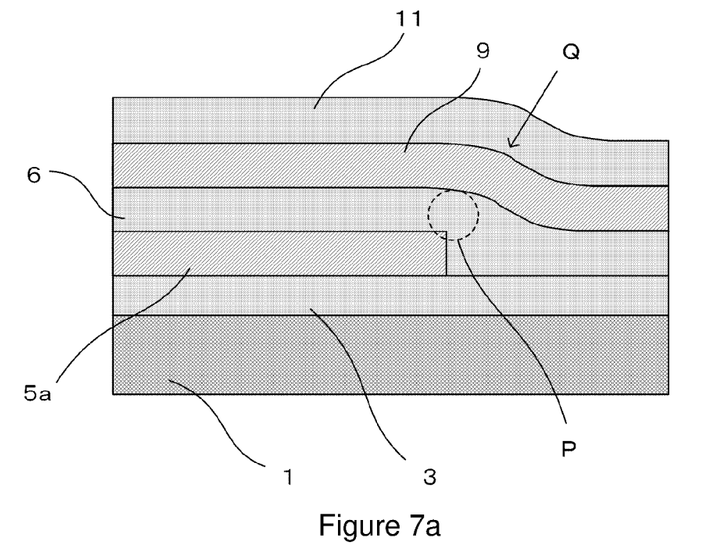
FIG. 7a is a sectional view illustrating a step coating shape of an insulating film in the on-chip type antenna according to the first embodiment of the present disclosure.
Figure 7B:
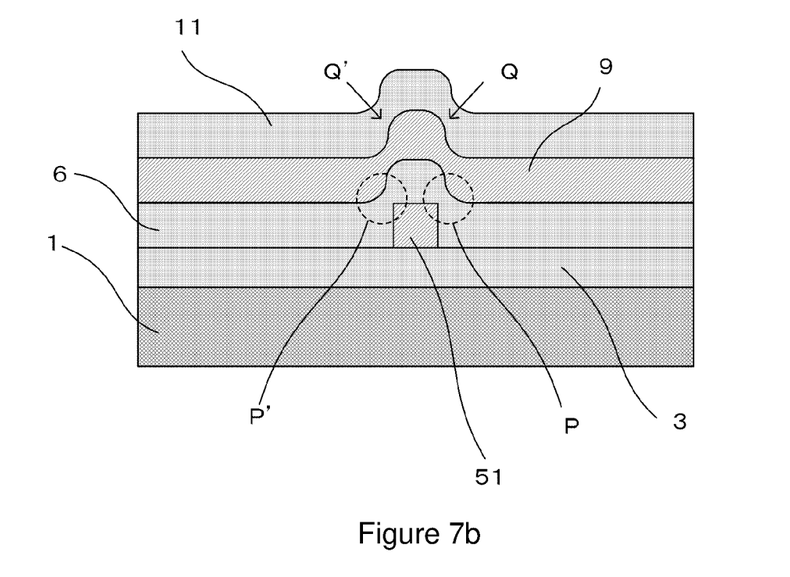
FIG. 7b is a sectional view illustrating a step coating shape of an insulating film in the on-chip type antenna using the conventional wiring structure.

FIG. 7a is an enlarged view of a cross section taken along the line A-A' of FIG. 6a, and FIG. 7b is an enlarged view of a cross section taken along the line B-B' of FIG. 6b, illustrating a state of the step covering property (coverage) of an insulating film when the insulating film is formed by a rotary coating method.

FIG. 7b illustrates an example in which the lower layer wiring is patterned in the shape of the normal wiring 51 as disclosed in Patent Literature 3. As illustrated in FIG. 7b, in regions P and P' where the second insulating film 6 (of the rotary coating film) formed by the rotary coating method is in contact with corner portions of the wiring 51, since the radius of curvature of the shape of the second insulating film 6 defined by the wiring 51 is small, the film thickness of the second insulating film 6 is thin. As a result, there is a possibility that the wiring 51 that is the lower layer wiring and the antenna wiring 9 that is the upper layer wiring are short-circuited, which may reduce product yield. For example, when a width of the wiring 51 (a line width L) is equal to or less than a film thickness of the second insulating film 6 to be formed, the above risk may be significant.

In addition, since the radius of curvature of regions Q and Q' of the antenna wiring 9 on the corner portions of the wiring 51 is small, there is a possibility that the antenna wiring 9 is cracked and disconnected by stresses from the second insulating film 6 and the third insulating film 11, which may reduce product yield. For instance, in both of the regions Q and Q' of the antenna wiring 9, the stresses of the second insulating film 6 and the third insulating film 11 act substantially symmetrically so that the stresses strengthen each other (the stresses are combined in the same direction), which increases a risk of the antenna wiring 9 being cracked.

In addition, when the second conductive film 8 of the antenna wiring 9 is formed by a sputtering method or a vapor deposition method, the covering property at a step portion of the second conductive film 8 may be deteriorated.

On the other hand, as illustrated in FIG. 7a, in the first lower layer wiring 5a in the present disclosure, the line width of the first lower layer wiring 5a is wider than each of the intervals Zx and Zy of the antenna wiring 9, and is, for example, 5 times wider or more, typically 30 times wider or more than the film thickness of the second insulating film 6 to be formed. Therefore, in the shape of the region P (the corner portion of the first lower layer wiring 5a) of the second insulating film 6 formed by a rotary coating method, the radius of curvature can be made large (smooth). For this reason, it is possible to inhibit the film thickness of the second insulating film 6 from being thinned.

As a result, the impact of the stresses from the second insulating film 6 and the third insulating film 11 is alleviated, which also makes it possible to prevent the antenna wiring 9 from being cracked and disconnected.

Furthermore, as illustrated in FIG. 6a, the structure of the first lower layer wiring 5a allows the first lower layer wiring 5a and the antenna wiring 9 to intersect at different positions and in different directions (see FIG. 6a). Therefore, unlike in FIG. 7b, the stresses are not combined.

In addition, when the second conductive film 8 of the antenna wiring 9 is formed by a sputtering method or a vapor deposition method, the covering property at the step portion of the second conductive film 8 is improved.

Furthermore, the shape of the first lower layer wiring 5a of the present disclosure also allows, for example, a larger degree of freedom in antenna design as described below.

Generally, a resonance frequency f of an antenna is obtained by the following equation.

$$f = 1/2\pi \times \sqrt{(LC)}$$

In this equation, L and C are an equivalent inductance and an equivalent capacitance of the antenna coil.

In addition, the electric power induced by the radio wave from a reader/writer increases substantially in proportion to the number of turns of the coil.

In a typical antenna coil design, design is made such that a large amount of electric power can be obtained by satisfying the value of the inductance L for achieving the above resonance frequency.

However, in the circuit of the IC chip 1, even if the resonance frequency is the same in the specifications, the input impedance of the IC chip 1 may vary depending on the circuit adopted for the IC chip 1. By matching the impedances of the IC chip 1 and the antenna wiring 9 so as to transmit, to the IC chip 1, the electric power obtained by the radio wave from the reader/writer, it is also possible to obtain a more preferred antenna coil.

Since the inter-wiring space of the antenna wiring 9 affects the inter-wiring capacitance of the antenna wiring 9, it is difficult to independently control the inductance L and the capacitance C only by the antenna wiring 9. However, by causing the antenna wiring 9 and the first lower layer wiring 5a to face each other, forming the first lower layer wiring 5a in a rectangular shape, for example, and changing Lx and Ly, it is possible to adjust the capacitance C at least partially, and is also possible to control both the inductance L and the capacitance C independently.

By utilizing the special shape of the first lower layer wiring 5a and structuring the antenna such that the inductance L and the capacitance C can be controlled, a larger degree of freedom is allowed in designing the antenna coil, which also makes it possible to easily obtain the optimum on-chip type coil.

In addition, the inductance L of the coil is generally proportional to the square of the number of turns and to the sectional area of the coil. However, when the IC chip 1 is miniaturized and a sufficient inductance L cannot be obtained, it is possible to achieve the necessary resonance frequency by increasing the capacitance C so that the value of the product of LC in the above equation of the resonance frequency is increased.

As described above, according to the present embodiment, the step covering property of the second insulating film (6) on the first relay wiring (5a) is improved, and a spiral wiring having good electrical characteristics can be obtained. Then, it is possible to provide a contactless information medium (for example, an RFID tag) provided with an on-chip type antenna capable of achieving both miniaturization and good electrical characteristics.

Second Embodiment

When a conductive film (a metal film) of the wiring is wet-etched using a pattern of a photoresist as a mask to form the wiring pattern (lower layer wiring, antenna wiring), a side wall of the wiring pattern after etching is etched and the etching amount increases toward the upper part of the wiring because the wet etching is isotropic etching. For this reason, the thicker the film thickness of the conductive film of the wiring is, the more difficult it is to control the sectional shape of the wiring. In addition, since the effective sectional area is reduced, wiring resistance and the variation thereof may increase.

Hereinafter, the patterning of the wiring capable of controlling the sectional shape of the wiring will be described mainly by taking the lower layer wirings 5a and 5b as examples, but the same applies to the patterning of the antenna wiring 9.

Figure 8A:
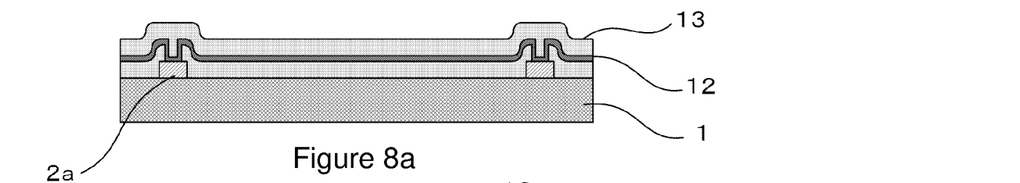
FIGS. 8a to 8e are sectional views illustrating a main manufacturing process of an on-chip type antenna according to a second embodiment of the present disclosure.

As illustrated in FIG. 8a, after the step of FIG. 1d, a conductive seed layer 12, for example, of Ni, Cr, Ti, Ta, or TiW, or a laminated film having copper (Cu) on the film of such a metal, with a total film thickness of 0.03 μm to 0.5 μm, for example, is formed by a vapor deposition method, a sputtering method, or the like.

After that, a photosensitive insulating film 13 (for example, of photosensitive polyimide, photoresist, or the like) is formed by a coating method.

The plating seed layer 12 functions as an electrode for feeding electric power when copper is formed by electrolytic plating. By using a metal nitride film such as of TaN or TiN (or using it at least as a part of the laminated film), for example, it is also possible to obtain an effect of preventing the copper from diffusing into the insulating film.

Figure 8B:
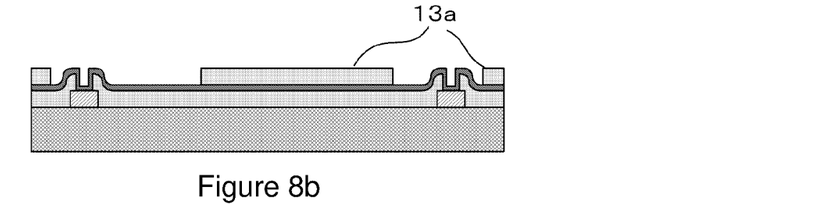

Next, as illustrated in FIG. 8b, the photosensitive insulating layer 13 is exposed and developed (etched) by a photolithography method, the photosensitive insulating film 13 is patterned, and a mask pattern 13a is formed. Therefore, the seed layer 12 is exposed in a region not covered by the mask pattern 13a.

The mask pattern 13a is a reverse pattern of the pattern of the lower layer wirings (the first lower layer wiring 5a and the second lower layer wiring 5b) to be formed. In addition, the mask pattern 13a exposes a portion of the periphery of the wafer, making it possible to feed electric power for electrolytic plating.

Figure 8C:
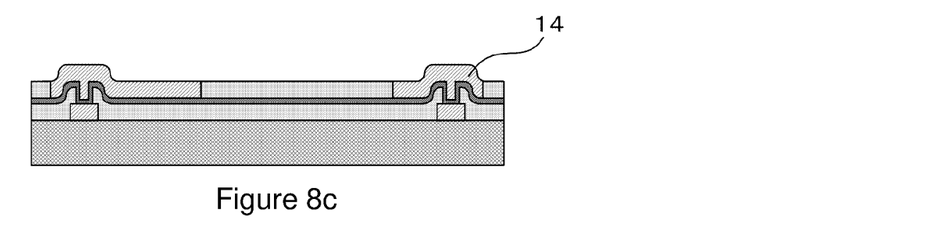

Next, as illustrated in FIG. 8c, a metal film 14 (for example, copper film) is selectively formed only on the exposed seed layer 12 by electrolytic plating using the seed layer 12 as an electrode.

Figure 8D:
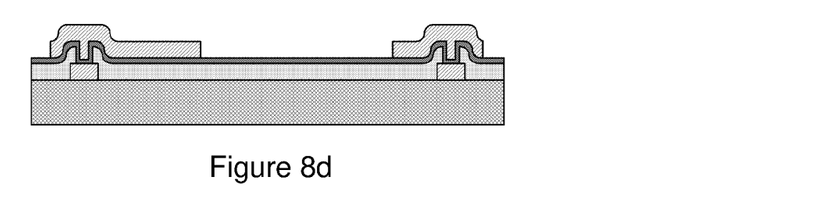

Next, as illustrated in FIG. 8d, the mask pattern 13a made of the photosensitive insulating film 13 is eliminated. The metal film 14 is formed on a part of the seed layer 12 as a reverse pattern of the mask pattern 13a.

Figure 8E:
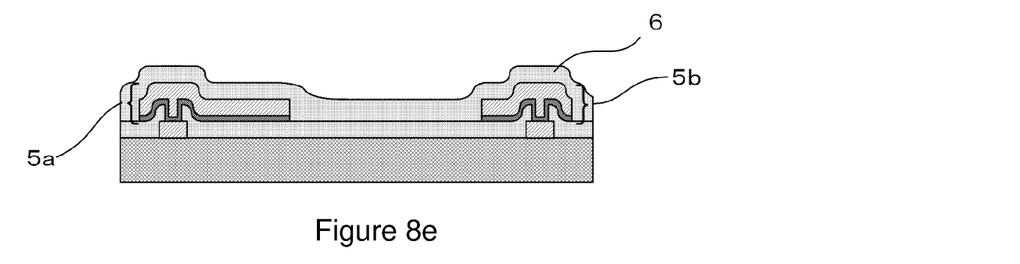

Next, as illustrated in FIG. 8e, the seed layer 12 not covered by the metal film 14 is selectively etched using the metal film 14 as an etching mask, leaving only the seed layer 12 under the metal film 14. In this case, in a laminated structure of the seed layer 12 and the metal film 14, dissimilar metals may come into contact with each other. After that, the second insulating film 6 is formed.

In this way, the lower layer wirings (the first lower layer wiring 5a and the second lower layer wiring 5b) having the laminated structure of the metal film 14 and the seed layer 12 can be formed.

Note that, in order to form the cross section of the lower layer wiring in a forward taper shape, the negative type photosensitive insulating layer 13 can be suitably used.

Figure 9A:
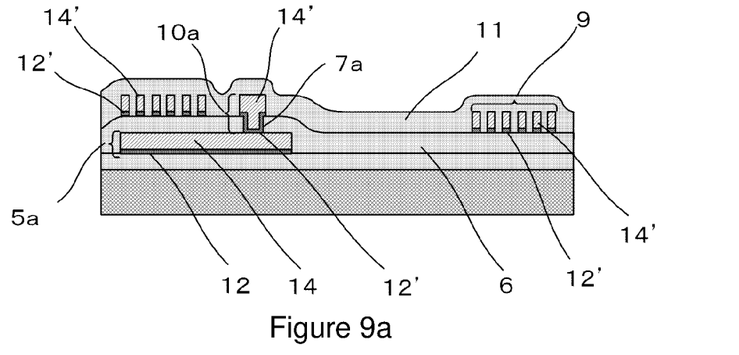
FIG. 9a is a sectional view and FIG. 9b is a top view illustrating the main manufacturing process of the on-chip type antenna according to the second embodiment of the present disclosure.

In a similar manner, as illustrated in FIG. 9a, the antenna wiring 9 (including the first end portion 10a and the second end portion 10b) having a laminated structure of a metal film 14' and a seed layer 12' can be formed.

The sectional shape of the wirings (the lower layer wiring and the antenna wiring) are determined by the mask pattern 13a of the photosensitive insulating layer 13, and the shape of the mask pattern 13a of the photosensitive insulating layer 13 is optically determined by a photolithography method. For this reason, the sectional shape of the formed wiring has a side wall surface that rises steeply as compared with the sectional shape of the wiring formed by using wet etching that is isotropic etching.

Note that the wiring formed by the above method has the laminated structure of the metal film 14 (14') and the seed layer 12 (12'). In FIG. 9a, a seed layer 12' is interposed at the bottom portion of the third opening (connecting hole) 7a where the antenna wiring 9 comes into contact with the first lower layer wiring 5a at the first end portion 10a. For this reason, when dissimilar metals are interposed as described above, contact resistance may increase (due to the formation of an alloy layer or the like).

However, as described below, the structure of the first lower layer wiring 5a can effectively reduce the contact resistance.

Figure 9B:
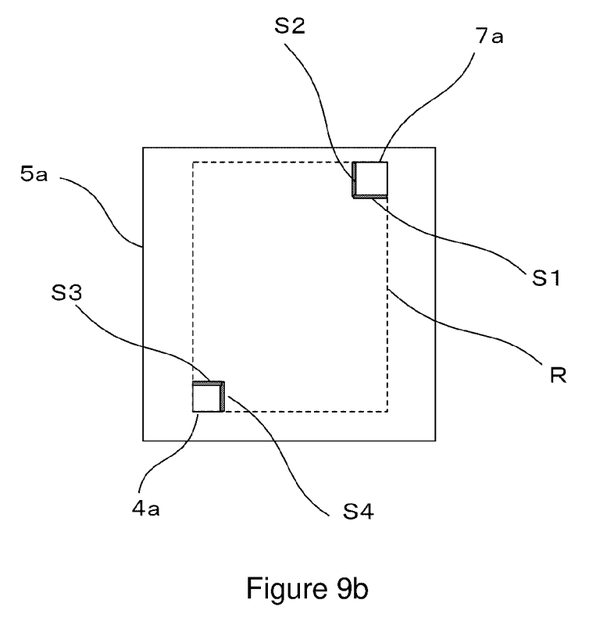

FIG. 9b is a diagram schematically illustrating mutual positional relationships between the first lower layer wiring 5a, and the first opening 4a and the third opening (connecting hole) 7a, and corresponds to the region C of FIG. 4c.

The first lower layer wiring 5a has a shape including the virtual rectangle R having the first opening (connecting hole) 4a and the third opening (connecting hole) 7a as the apexes of the diagonal line.

For this reason, even if a current concentration effect due to the increase in the contact resistance between the third opening (connecting hole) 7a and the first lower layer wiring 5a causes the electric current to concentrate on the peripheral portion of the third opening (connecting hole) 7a, the current path between the rectangle R and the third opening (connecting hole) 7a includes at least sides S1 and S2.

In the case of the conventional wiring 51, the peripheral portion via which the electric current flows is limited in one direction due to the width of the wiring 51, resulting in increase in the resistance. However, since the first lower layer wiring 5a is structured as described above, the path via which the electric current flows toward the third opening (connecting hole) 7a can be increased, and the contact resistance can be reduced.

This also applies to the relation between the first lower layer wiring 5a and the first opening (connecting hole) 4a, where the contact portions are at least sides S3 and S4, and the contact resistance can be reduced.

Note that when the first lower layer wiring 5a and/or the antenna wiring 9 are/is formed by laminating dissimilar metal films in the first embodiment, the contact resistance can be similarly reduced.

Note that the IC chip 1 provided with the above antenna wiring 9 can be packaged after a known dicing step, which can provide a contactless information carrier such as an RFID tag, for example.

In this manner, by structuring the lower layer wiring (and the antenna wiring and the connecting holes) as described above, it is possible to obtain the effects and the like as exemplified above, and provide an on-chip type antenna having good electrical characteristics.

INDUSTRIAL APPLICABILITY

According to the present disclosure, the electrically good on-chip type antenna can be achieved, and the contactless information carrier capable of being used for an RFID tag and the like can be provided, which makes the industrial applicability thereof significant.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

REFERENCE SIGNS LIST

1 IC chip
2 Electrodes
2a First electrode
2b Second electrode
3 First insulating film
4 Openings (connecting holes)
4a First opening (connecting hole)
4b Second opening (connecting hole)
5 First conductive film
5a First lower layer wiring
5b Second lower layer wiring
6 Second insulating film
7 Openings (connecting holes)
7a Third opening (connecting hole)
7b Fourth opening (connecting hole)
8 Second conductive film
9 Antenna wiring (spiral wiring)
10a First end portion
10b Second end portion
11 Third insulating film
12, 12' Seed layer
13 Photosensitive insulating film
13a Mask pattern
14, 14' Metal film
51 Wiring

The invention claimed is:
1. A contactless information carrier, comprising:
an IC chip having a first electrode and a second electrode; and
a spiral wiring having a first end portion and a second end portion electrically connected to the first electrode and the second electrode, respectively, wherein:
the IC chip is provided with:
a first insulating film on the first electrode and the second electrode;
a first relay wiring on the first insulating film; and
a second insulating film on the first relay wiring;
the spiral wiring is formed on the second insulating film;
the first end portion and the second end portion are positioned on an inner peripheral side and an outer peripheral side of the spiral wiring, respectively;
the first electrode and the second electrode are positioned on the outer peripheral side of the spiral wiring; and
the first relay wiring:
is conductive and connected to the first electrode via a first connecting hole formed in the first insulating film and is connected to the first end portion via a third connecting hole formed in the second insulating film,
includes rectangular region comprising one side in an X-axis direction and another side in a Y-axis direction and diagonally including the first connecting hole and the third connecting hole;
wherein the first relay wiring is in a shape of a rectangle comprising a first side in the X-axis direction and a second side in the Y-axis direction, the spiral wiring is intersected on two intersecting sides of the rectangle in the X-axis direction and the Y-axis direction, respectively, and a respective length of the first side of the rectangle and the second side of the rectangle at each intersecting side with the spiral wiring is larger than a respective total wiring width of the spiral wiring.

2. The contactless information carrier according to claim 1, wherein the second insulating film is a rotary coating film.

3. The contactless information carrier according to claim 1, wherein at least one of the first relay wiring and the spiral wiring includes a metal formed by a plating method.

4. The contactless information carrier according to claim 1, wherein at least one of the first relay wiring and the spiral wiring is structured such that dissimilar metals are stacked.

* * * * *